(12) United States Patent
Deng et al.

(10) Patent No.: US 12,339,663 B2
(45) Date of Patent: Jun. 24, 2025

(54) METHOD AND SYSTEM FOR GUIDING AUTONOMOUS MOBILE VEHICLES WITHIN A LOGISTIC FACILITY

(71) Applicant: TE Connectivity Services GmbH, Schaffhausen (CH)

(72) Inventors: Xinping Deng, Lancaster, PA (US); Swapnilsinh Solanki, Harrisburg, PA (US); Roberto Francisco-Yi Lu, Bellevue, WA (US)

(73) Assignee: TE Connectivity Solutions GmbH (CH)

( * ) Notice: Subject to any disclaimer, the term of this patent is extended or adjusted under 35 U.S.C. 154(b) by 8 days.

(21) Appl. No.: 16/932,994

(22) Filed: Jul. 20, 2020

(65) Prior Publication Data

US 2021/0116928 A1 Apr. 22, 2021

Related U.S. Application Data

(60) Provisional application No. 62/923,899, filed on Oct. 21, 2019.

(51) Int. Cl.
   *G05D 1/02* (2020.01)
   *G05D 1/00* (2006.01)

(52) U.S. Cl.
   CPC ......... *G05D 1/0217* (2013.01); *G05D 1/0022* (2013.01); *G05D 1/0225* (2013.01)

(58) Field of Classification Search
   CPC ... G05D 1/0217; G05D 1/0022; G05D 1/0225
   See application file for complete search history.

(56) References Cited

U.S. PATENT DOCUMENTS

| | | | |
|---|---|---|---|
| 2008/0167884 A1* | 7/2008 | Mountz | G06Q 10/0833 705/29 |
| 2013/0006418 A1* | 1/2013 | Tian | H02J 7/00036 700/245 |
| 2014/0142737 A1* | 5/2014 | Tanna | G06Q 10/06375 700/99 |
| 2014/0350725 A1* | 11/2014 | LaFary | G05D 1/0274 901/50 |
| 2015/0039157 A1* | 2/2015 | Wolfe | G06Q 10/0639 701/2 |
| 2015/0367513 A1* | 12/2015 | Gettings | G06Q 10/06 700/248 |
| 2018/0246503 A1* | 8/2018 | Bauer | G06Q 10/08 |
| 2019/0066041 A1* | 2/2019 | Hance | B65G 1/137 |
| 2019/0139441 A1* | 5/2019 | Akella | G06N 3/08 |
| 2020/0223630 A1* | 7/2020 | Fosnight | B65G 1/0464 |
| 2020/0316786 A1* | 10/2020 | Galluzzo | B25J 9/162 |
| 2021/0047121 A1* | 2/2021 | Stevens | B65G 1/065 |
| 2021/0048829 A1* | 2/2021 | Deyle | G05D 1/0274 |

* cited by examiner

*Primary Examiner* — Jess Whittington

(57) ABSTRACT

An autonomous mobile vehicle system includes machines at different locations within a facility processing parts, a docking station within the facility, an autonomous mobile vehicle movable within the facility between the machines and the docking station, and a system control module for guiding the autonomous mobile vehicle within the facility between the machines and the docking station. The system control module includes a system communication module communicatively coupled to the autonomous mobile vehicle. The system control module includes a system controller including one or more processors configured to control operation of the autonomous mobile vehicle.

19 Claims, 10 Drawing Sheets

| Vehicle | AMA | Population | Capacity | ScheduledUtilization | Percent | 47.9224 |
|---|---|---|---|---|---|---|
| | | | | UnitsAllocated | Total | 136.0000 |
| | | | | | Average | 1.0000 |
| | | | | | Maximum | 1.0000 |
| | | | | Units Scheduled | Average | 0.4792 |
| | | | | | Maximum | 1.0000 |
| | AMA[1] | [Object] | Travel | DistanceTraveled | Total (Meters) | 18,359.7200 |
| | | [Resource] | Capacity | ScheduleUtilization | Percent | 47.99224 |
| | | | | UnitsAllocated | Total | 136.0000 |
| | | | | | Average | 1.0000 |
| | | | | UnitsScheduled | Maximum | 1.0000 |
| | | | | | Average | 0.4792 |
| | | | | UnitsUtilized | Maximum | 1.0000 |
| | | | ResourceState | TimeIdle | Average (Hours) | 0.1562 |
| | | | | | Occurrences | 80.0000 |
| | | | | | Percent | 52.0776 |
| | | | | | Total (Hours) | 12.4986 |
| | | | | TimeTransporting | Average (Hours) | 0.1438 |
| | | | | | Occurrences | 80.0000 |
| | | | | | Percent | 47.9224 |
| | | | | | Total (Hours) | 11.5014 |

FIG. 10

| Vehicle | AMA | Population | Capacity | ScheduledUtilization | Percent | 50.1652 |
| --- | --- | --- | --- | --- | --- | --- |
| | | | | UnitsAllocated | Total | 136.0000 |
| | | | | Units Scheduled | Average | 1.0000 |
| | | | | | Maximum | 1.0000 |
| | | | | UnitsUtilized | Average | 0.5017 |
| | | | | | Maximum | 1.0000 |
| | AMA[1] | [Object] [Resource] | Travel | DistanceTraveled | Total (Meters) | 18,263.1000 |
| | | | Capacity | ScheduleUtilization | Percent | 50.1652 |
| | | | | UnitsAllocated | Total | 136.0000 |
| | | | | UnitsScheduled | Average | 1.0000 |
| | | | | | Maximum | 1.0000 |
| | | | | UnitsUtilized | Average | 0.5017 |
| | | | | | Maximum | 1.0000 |
| | | | ResourceState | TimeIdle | Average (Hours) | 0.1553 |
| | | | | | Occurrences | 77.0000 |
| | | | | | Percent | 49.8348 |
| | | | | | Total (Hours) | 11.9604 |
| | | | | TimeTransporting | Average (Hours) | 0.1564 |
| | | | | | Occurrences | 77.0000 |
| | | | | | Percent | 50.1652 |
| | | | | | Total (Hours) | 12.0396 |

FIG. 11

METHOD AND SYSTEM FOR GUIDING AUTONOMOUS MOBILE VEHICLES WITHIN A LOGISTIC FACILITY

CROSS-REFERENCE TO RELATED APPLICATIONS

This application claims priority to U.S. Provisional Application No. 62/923,899, filed 21 Oct. 2019, titled "AUTONOMOUS MOBILE VEHICLE AND METHOD OF OPERATING THE AUTONOMOUS MOBILE VEHICLE," which is incorporated by reference herein in its entirety.

BACKGROUND OF THE INVENTION

The subject matter herein relates generally to automatic guided vehicle systems.

AGVs (Automatic Guided Vehicles) are becoming increasingly popular in production facilities to transport parts and materials autonomously from one location to the another one. It is difficult to determine the number of AGVs to be used in a particular facility. Providing too many AGVs leads to excess cost and too much idle time of the AGVs. Providing too few AGVs leads to down time of machines within the facility or insufficient charging of the AGVs which can deteriorate the batteries of the AGVs. Additionally, facility layout is difficult to determine efficiently.

A need remains for an autonomous mobile vehicle and method of operating autonomous mobile vehicles in a cost effective and reliable manner.

BRIEF DESCRIPTION OF THE INVENTION

In one embodiment, an autonomous mobile vehicle system includes machines at different locations within a facility processing parts, a docking station within the facility, an autonomous mobile vehicle movable within the facility between the machines and the docking station, and a system control module for guiding the autonomous mobile vehicle within the facility between the machines and the docking station. The system control module includes a system communication module communicatively coupled to the autonomous mobile vehicle. The system control module includes a system controller including one or more processors configured to determine a finishing time of a machine process of a first machine of the machines, one or more processors configured to determine a travel time of the autonomous mobile vehicle to the first machine, one or more processors configured to send a request to the autonomous mobile vehicle based on the finishing time of the machine process of the first machine and the travel time of the autonomous mobile vehicle to the first machine and placing the request in the queue of the autonomous mobile vehicle, one or more processors configured to determine if the request from the first machine has higher priority than other requests in the queue, wherein, if the request from the first machine has higher priority, the system controller sends the autonomous mobile vehicle to the first machine, and one or more processors configured to determine if the request from the first machine has a shorter estimated finishing time than requests from other machines, wherein if the request from the first machine has a shorter finishing time, the system controller sends the autonomous mobile vehicle to the first machine, and wherein if the request from the first machine does not have a shorter finishing time, the system controller sends the autonomous mobile vehicle to the machine with the shortest finishing time.

In another embodiment, a method of operating an autonomous mobile vehicle between machines of a logistic facility is provided including determining a finishing time of a machine process of a first machine of the machines and determining a travel time of the autonomous mobile vehicle to the first machine. The method includes sending a request to the autonomous mobile vehicle based on the finishing time of the machine process of the first machine and the travel time of the autonomous mobile vehicle to the first machine and placing the request in the queue of the autonomous mobile vehicle. The method includes determining if the request from the first machine has higher priority than other requests in the queue, wherein, if the request from the first machine has higher priority, the autonomous mobile vehicle is sent to the first machine. The method includes determining if the request from the first machine has a shorter estimated finishing time than requests from other machines, wherein if the request from the first machine has a shorter finishing time, the autonomous mobile vehicle is sent to the first machine, and wherein if the request from the first machine does not have a shorter finishing time, the autonomous mobile vehicle is sent to the machine with the shortest finishing time.

In a further embodiment, a method of planning an autonomous mobile vehicle operation between processing machines of a logistic facility and a docking station of the logistic facility is provided. The method includes determining first finishing times of machine processes of the processing machines with the docking station at a first simulated position and determining second finishing times of machine processes of the processing machines with the docking station at a second simulated position. The method includes determining first travel times of the autonomous mobile vehicle between the processing machines and the docking station at the first simulated position and determining second travel times of the autonomous mobile vehicle between the processing machines and the docking station at the second simulated position. The method includes determining a first autonomous mobile vehicle utilization rate based on the first finishing times and first travel times and determining a second autonomous mobile vehicle utilization rate based on the second finishing times and second travel times. The method includes comparing the first autonomous mobile vehicle utilization rate and the second autonomous mobile vehicle utilization rate and planning a logistic facility layout based on which of the first autonomous mobile vehicle utilization rate and the second autonomous mobile vehicle utilization rate is higher.

BRIEF DESCRIPTION OF THE DRAWINGS

FIG. 10 is a chart showing a utilization rate of a sub-optimal logistic facility layout in accordance with an exemplary embodiment.

FIG. 11 is a chart showing a utilization rate of an optimal logistic facility layout in accordance with an exemplary embodiment.

DETAILED DESCRIPTION OF THE INVENTION

Figure 1:
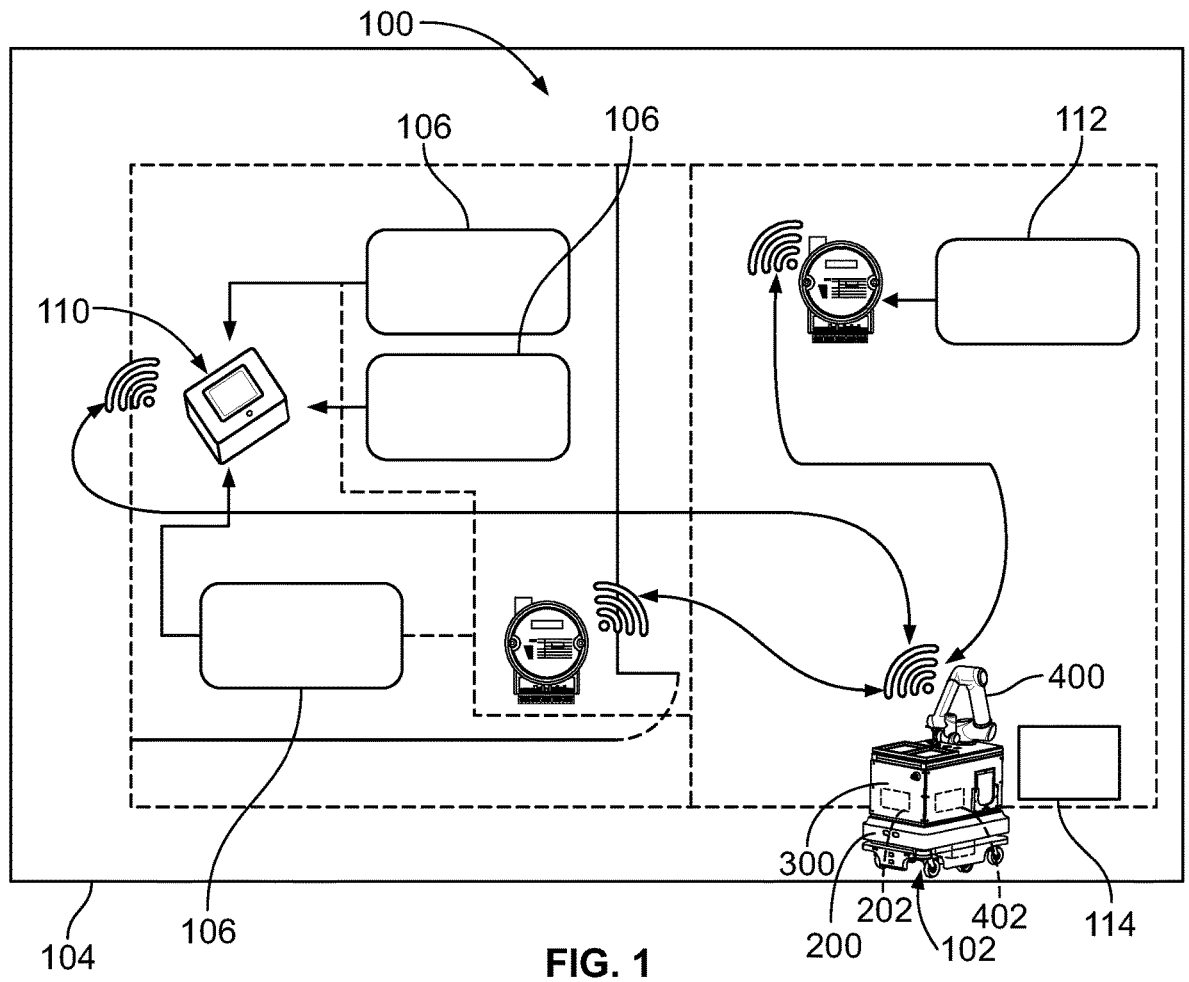
FIG. 1 is a schematic illustration of an autonomous mobile vehicle system in accordance with an exemplary embodiment.

FIG. 1 is a schematic illustration of an autonomous mobile vehicle system 100 in accordance with an exemplary embodiment. The autonomous mobile vehicle system 100 is used to control movements of mobile robots or autonomous mobile vehicles 102 within a logistics facility 104, such as a warehouse, a distribution center, and manufacturing facility, a retail facility, and the like. The autonomous mobile vehicles 102 are used for part picking and part drop-off within the logistics facility 104. For example, the autonomous mobile vehicles 102 are used to pick up parts from one or more processing machines 106, such as manufacturing machines, storage bins, and the like, and the autonomous mobile vehicles 102 are used to drop off parts at other machines, such as other manufacturing machines, storage bins, and the like. The autonomous mobile vehicles 102 may be used to move parts to a lathe machine, a cleaning machine, an inspection machine, or other manufacturing machines.

In an exemplary embodiment, the autonomous mobile vehicle system 100 includes a system control module 110 located within the logistics facility 104, such as within a location or room containing one or more of the machines 106. The system control module 110 is communicatively coupled to the machines 106, such as by wired connections or wireless connections. The system control module 110 is communicatively coupled to a plurality of the autonomous mobile vehicles 102 to control part processing within the logistics facility 104, such as movement of the parts between the machines 106 using the autonomous mobile vehicles 102. The autonomous mobile vehicles 102 transport the parts autonomously from one location to another, such as between the machines 106 based on control signals received from the system control module 110.

In an exemplary embodiment, the autonomous mobile vehicle system 100 includes an operator station 112 for managing and controlling the autonomous mobile vehicle system 100. The operator station 112 is communicatively coupled to the system control module 110 to monitor and/or control operation of the system control module 110. The operator station 112 is communicatively coupled to the autonomous mobile vehicles 102 to monitor and/or control the autonomous mobile vehicles 102. For example, the operator station 112 may be wirelessly coupled to the autonomous mobile vehicles 102.

In an exemplary embodiment, the autonomous mobile vehicle system 100 includes docking stations 114 for the autonomous mobile vehicles 102. The docking stations 114 may be used to store and or charge the autonomous mobile vehicles 102. In an exemplary embodiment, the autonomous mobile vehicles 102 return to the docking station 114 after performing one or more tasks to recharge the autonomous mobile vehicles 102. In various embodiments, the autonomous mobile vehicles 102 may require approximately 50% charging time versus 50% operation time. In other various embodiments, the autonomous mobile vehicles 102 may require less charging time, such as approximately 25% or 33% charging time versus operating time. In various embodiments, the autonomous mobile vehicle system 100 may utilize multiple autonomous mobile vehicles 102 to ensure that the autonomous mobile vehicles 102 are sufficiently charged and available for use at all times. The autonomous mobile vehicle system 100 may include a planning module for determining a required number of autonomous mobile vehicles 102 needed for the particular layout of the logistics facility 104, such as based on the number of machines 106, the processing times of the machines, the physical layout of the machines 106, the travel time of the autonomous mobile vehicles 102 between the machines, the wait time of the autonomous mobile vehicles 102 at the machines during processing, the charging time of the autonomous mobile vehicles 102, and the like. The autonomous mobile vehicle system 100 may determine the required number of autonomous mobile vehicles 102 needed based on simulated utilization rates of the autonomous mobile vehicles 102 during a planning mode of the planning module. The planning module may perform a multi-iteration of facility layouts to determine which of the iterated layouts has the comparatively optimal layout.

The autonomous mobile vehicle 102 navigates autonomously from point-to-point within the logistics facility 104, such as to pick up parts, drop off parts, inventory parts, or return to the docking station 114. For example, the autonomous mobile vehicle 102 moves along one or more paths through the logistics facility 104 between the docking station 114 and the machines 106.

In an exemplary embodiment, the autonomous mobile vehicle 102 includes an automatic guided vehicle (AGV) 200, a platform assembly 300 mounted to the AGV 200, and a collaborative manipulator 400 mounted to the platform assembly 300. The AGV 200 is used to move the autonomous mobile vehicle 102 around the logistics facility 104. The collaborative manipulator 400 is used for manipulating the parts at the machines 106. For example, the collaborative manipulator 400 may include a robot arm and/or a gripper and/or a conveyor in various embodiments. Other types of part manipulators may be utilized in alternative embodiments. The platform assembly 300 provides a mechanical and electrical connection between the AGV 200 and the collaborative manipulator 400. The platform assembly 300 may be modular and/or scalable for mounting to different types of AGVs 200 and/or for mounting different types of collaborative manipulators 400. An AGV controller 202 is provided for control of the AGV 200. The AGV controller 202 forms part of the control system of the autonomous mobile vehicle system 100, such as being part of the system control module 110, although being housed in the AGV 200. A collaborative manipulator controller 402 is provided for control of the collaborative manipulator 400. The collaborative manipulator controller 402 forms part of the control system of the autonomous mobile vehicle system 100, such as being part of the system control module 110, although being housed in the platform assembly 300. In various embodiments, the AGV controller 202 and the collaborative manipulator controller 402 may be integrated into a single controller for the autonomous mobile vehicle 102.

Other types of autonomous mobile vehicles 102 may be used in alternative embodiments. For example, the autonomous mobile vehicles 102 may be provided without the collaborative manipulator 400 and/or the platform assembly 300. The autonomous mobile vehicles 102 may instead be manually loaded and unloaded at the various machines.

Figure 2:
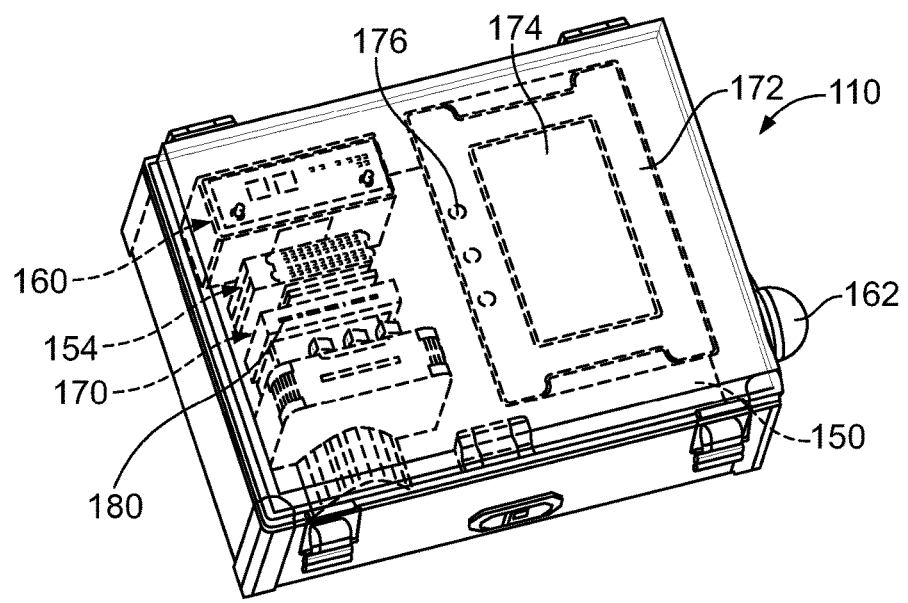
FIG. 2 is a top perspective view of a system control module in accordance with an exemplary embodiment.

FIG. 2 is a top perspective view of the system control module 110 in accordance with an exemplary embodiment. The system control module 110 holds a plurality of system components. In various embodiments, the system control module 110 includes one or more substrates 150, such as circuit boards, for the system components. The system control module 110 may include one or more connectors 152 coupled to the substrate 150 to create electrical connections with the system control module 110. The connectors 152 may be power connectors and/or a data communication connectors. Power wires and/or data communication wires may extend from the connectors 152. The system control module 110 may include one or more I/O modules 154 coupled to the substrate 150. The I/O modules 154 may be electrically connected to other components of the autonomous mobile vehicle system 100, such as the machines 106 (shown in FIG. 1), using plug connectors or hardwiring between the I/O module 154 and the machines 106. In other various embodiments, the system control module 110 may communicate with the machines 106 by wireless data communication rather than being hardwired.

The system control module 110 includes a communication module 160 coupled to the substrate 150. The communication module 160 is configured to communicate wirelessly with other components of the autonomous mobile vehicle system 100, such as the autonomous mobile vehicles 102 (shown in FIG. 1) and/or the system control module 110 (shown in FIG. 1) and/or the machines 106. The communication module 160 is capable of transmitting and receiving signals. In an exemplary embodiment, the communication module 160 is electrically connected to an antenna 162, such as an omnidirectional antenna. The communication module 160 is configured to communicate via one or more wireless networking protocols, such as a Wi-Fi communication protocol. The communication module 160 may use other wireless forms of communication, such as cellular data communication. In various embodiments, the communication module 160 communicates with the autonomous mobile vehicles 102 and other components within the system 100 via a Modbus TCP protocol; however, the communication module 160 may communicate by other communication protocols in alternative embodiments.

In an exemplary embodiment, the system control module 110 includes a system controller 170 for processing the control scheme for the autonomous mobile vehicle system 100. The system controller 170 receives inputs from the operator station 112, the machines 106, the docking stations 114 and the autonomous mobile vehicles 102 and generates outputs to the operator station 112, the machines 106, the docking stations 114 and the autonomous mobile vehicles 102. The system controller 170 guides the autonomous mobile vehicles 102 between the various machines 106 and the docking stations 114 within the autonomous mobile vehicle system 100. For example, the system controller 170 may receive inputs from the machines 106 requesting part pickup or part delivery. The system controller 170 determines which autonomous mobile vehicle 102 is to perform the various tasks and provides guidance and/or route planning for the autonomous mobile vehicles 102 within the logistics facility 104 to pickup the parts and/or drop off the parts in accordance with the control scheme. The inputs and outputs are received and/or transmitted via the I/O modules 154 and/or the communication module 160.

The system controller 170 includes electronic components, such as one or more processors 180, a memory, and the like for data processing and control of the components of the autonomous mobile vehicle system 100. In an exemplary embodiment, the system controller 170 includes logic software that receives inputs, prioritizes requests from the machines 106, sends control signals to the autonomous mobile vehicles 102, receives location and task information from the autonomous mobile vehicles 102, prioritizes control functions of the autonomous mobile vehicles 102, sends acknowledgment signals to the machines 106 and/or the autonomous mobile vehicles 102, and the like. The system controller 170 may continuously monitor incoming requests from the machines 106. The system controller 170 sends pickup and delivery requests to the autonomous mobile vehicles 102 based on priorities assigned to the machines 106. The system controller 170 sends acknowledgment signals to the machines 106 upon completion of the pickup and drop-off tasks by the autonomous mobile vehicles 102.

In an exemplary embodiment, the system control module 110 includes a human machine interface (HMI) 172 communicatively coupled to the system controller 170 and/or the communication module 160. The HMI 172 may provide a log or status of inputs and outputs to and from the system control module 110 for the user to review. The HMI 172 receives inputs from an operator of the system control module 110. The HMI 172 includes a display 174 and inputs 176. For example, the inputs 176 may be buttons, dials, a keypad, a keyboard, and the like. Optionally, the display 174 may be a touchscreen having digital inputs on the display 174. In an exemplary embodiment, the HMI is a remote control device removable from the system control module 110. In various embodiments, the user may connect to and/or monitor one or more of the autonomous mobile vehicles 102 via the HMI 172. The user may remotely control the autonomous mobile vehicles 102 through the HMI 172.

Figure 3:
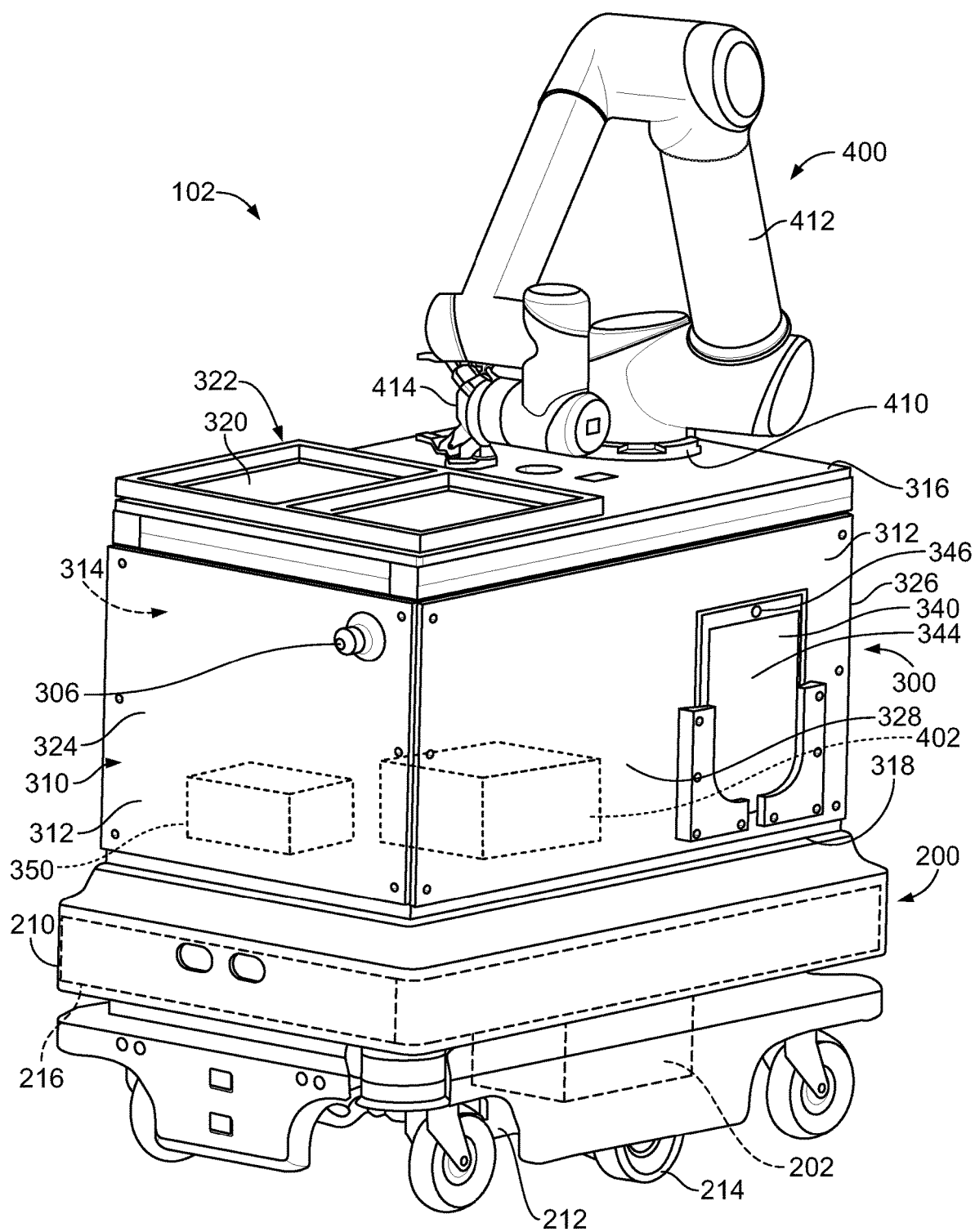
FIG. 3 is a front perspective view of an autonomous mobile vehicle in accordance with an exemplary embodiment.

FIG. 3 is a front perspective view of the autonomous mobile vehicle 102 in accordance with an exemplary embodiment. FIG. 3 illustrates the platform assembly 300 mounted to the AGV 200 and illustrates the collaborative manipulator 400 mounted to the platform assembly 300.

The AGV 200 includes a base 210 housing a motor 212 and wheels 214 driven by the motor 212 from moving the AGV 200. The AGV 200 includes a battery 216 coupled to the motor 212 to power the motor 212. In an exemplary embodiment, the AGV 200 includes the AGV controller 202 for controlling movement of the AGV 200. The AGV controller 202 is operably coupled to the motor 212. The AGV controller 202 controls operation of the motor 212 to move the AGV 200. The AGV controller 202 is communicatively coupled to the system control module 110 (shown in FIG. 1) to receive control signals for operating the AGV 200. For example, the AGV controller 202 may receive route information to guide the AGV 200 along a particular path, such as between the docking station 114 and the machines 106 (shown in FIG. 1). The AGV controller 202 may receive information instructing the AGV 200 to stop, to move forward, to move rearward, and/or to turn right or left for controlling movement of the AGV 200.

The AGV controller 202 includes electronic components, such as one or more processor(s), a memory, and the like for data processing and control of the components of the AGV 200. In an exemplary embodiment, the AGV controller 202 includes logic software that receives inputs, receives location and task information, maps routes between locations, plans movements, prioritizes requests, prioritizes control functions, sends acknowledgment signals, and the like. The AGV controller 202 may receive the inputs from the system controller 170 or from other components.

The platform assembly 300 includes a frame 310 having walls 312 enclosing a cavity 314. The walls 312 extend between a top 316 and a bottom 318 of the frame 310. The bottom 318 of the frame 310 is mounted to the base 210 of the AGV 200. The platform assembly 300 is moved with the AGV 200. In an exemplary embodiment, the platform assembly 300 includes an emergency stop button 306 on one of the walls 312 that may be used to stop operation of the AGV 200 and/or the collaborative manipulator 400. Optionally, one or more of the walls 312 may include vents for air circulation through the cavity 314.

The platform assembly 300 includes a support plate 320 at the top 316. The support plate 320 supports the collaborative manipulator 400. For example, the collaborative manipulator 400 may be mounted directly to the support plate 320, such as using fasteners. In an exemplary embodiment, the support plate 320 includes a plurality of mounting locations for mounting the collaborative manipulator 400 at different locations on the support plate 320 and/or for mounting different types of collaborative manipulators on the support plate 320. For example, the support plate 320 may include different hole patterns at the different mounting locations for receiving different types of collaborative manipulators 400. In an exemplary embodiment, the platform assembly 300 includes a part holder 322 at the top of the support plate 320. The part holder 322 may include rails or walls forming a space to receive and retain the parts on the support plate 320 during transport, such as between the machines 106. In the illustrated embodiment, the part holder 322 is located proximate to a front 324 of the platform assembly 300. However, the part holder 322 may be located at other locations, such as proximate to a rear 326 of the platform assembly 300 and or the sides 328 of the platform assembly 300.

In an exemplary embodiment, the collaborative manipulator 400 includes a mounting base 410 that is mounted to the support plate 320, such as using fasteners. In the illustrated embodiment, the collaborative manipulator 400 is mounted proximate to the rear 326 of the platform assembly 300. Other mounting locations are possible in alternative embodiments. The mounting base 410 fixes the collaborative manipulator 400 relative to the platform assembly 300. In an exemplary embodiment, the collaborative manipulator 400 includes an arm 412 and a gripper 414 at an end of the arm 412 used for picking up the parts and moving the parts to her from the part holder 322. The arm 412 may be a four-axis manipulating arm or a six-axis manipulating arm in various embodiments. Other types of robot arms may be used in alternative embodiments. In other various embodiments, other types of part manipulators may be utilized rather than the gripper 414 and/or the arm 412. For example, the collaborative manipulator 400 may include a conveyor, a stack light, or other type of manipulator.

In an exemplary embodiment, the platform assembly 300 includes a remote control device 340, which may be removably coupled to the frame 310. The remote control device 340 defines a human machine interface for the platform assembly 300, such as for controlling the AGV 200 and/or the collaborative manipulator 400 (both shown in FIG. 3). The remote control device 340 may be communicatively coupled to the AGV controller 202 and/or the collaborative manipulator controller 402. The remote control device 340 receives inputs from an operator to monitor and/or control the autonomous mobile vehicle 102. In an exemplary embodiment, the remote control device 340 is communicatively coupled to the system control module 110 and/or the operator station 112 (both shown in FIG. 1) for remote monitoring and/or control of the autonomous mobile vehicle 102 through the remote control device 340. In an exemplary embodiment, the remote control device 340 includes a display 344 and inputs 346 for directly receiving inputs from the operator. For example, the inputs 346 may be buttons, dials, a keypad, a keyboard, and the like. Optionally, the display 344 may be a touchscreen having digital inputs on the display 344. In various embodiments, the remote control device 340 may be a tablet.

The collaborative controller 402 includes a communication module 350 configured to communicate wirelessly with other components of the autonomous mobile vehicle system 100, such as the communication module 160 (shown in FIG. 1) of the system control module 110 (shown in FIG. 1) and/or the operator station 112 (shown in FIG. 1) and/or the remote control device 340. In an exemplary embodiment, the communication module 350 includes an antenna, such as an omnidirectional antenna. The communication module 350 is configured to communicate via one or more wireless networking protocols, such as a Wi-Fi communication protocol. The communication module 350 may use other wireless forms of communication, such as cellular data communication. Control signals received at the communication module 350 are used to control the collaborative manipulator 400, such as to move the arm 412 and/or the gripper 414.

The collaborative controller 402 includes electronic components, such as one or more processor(s), a memory, and the like for data processing and control of the components of the collaborative manipulator 400. In an exemplary embodiment, the collaborative controller 402 includes logic software that receives inputs, receives location and task information, prioritizes requests, plans movements, prioritizes control functions, sends acknowledgment signals, and the like.

Figure 4:
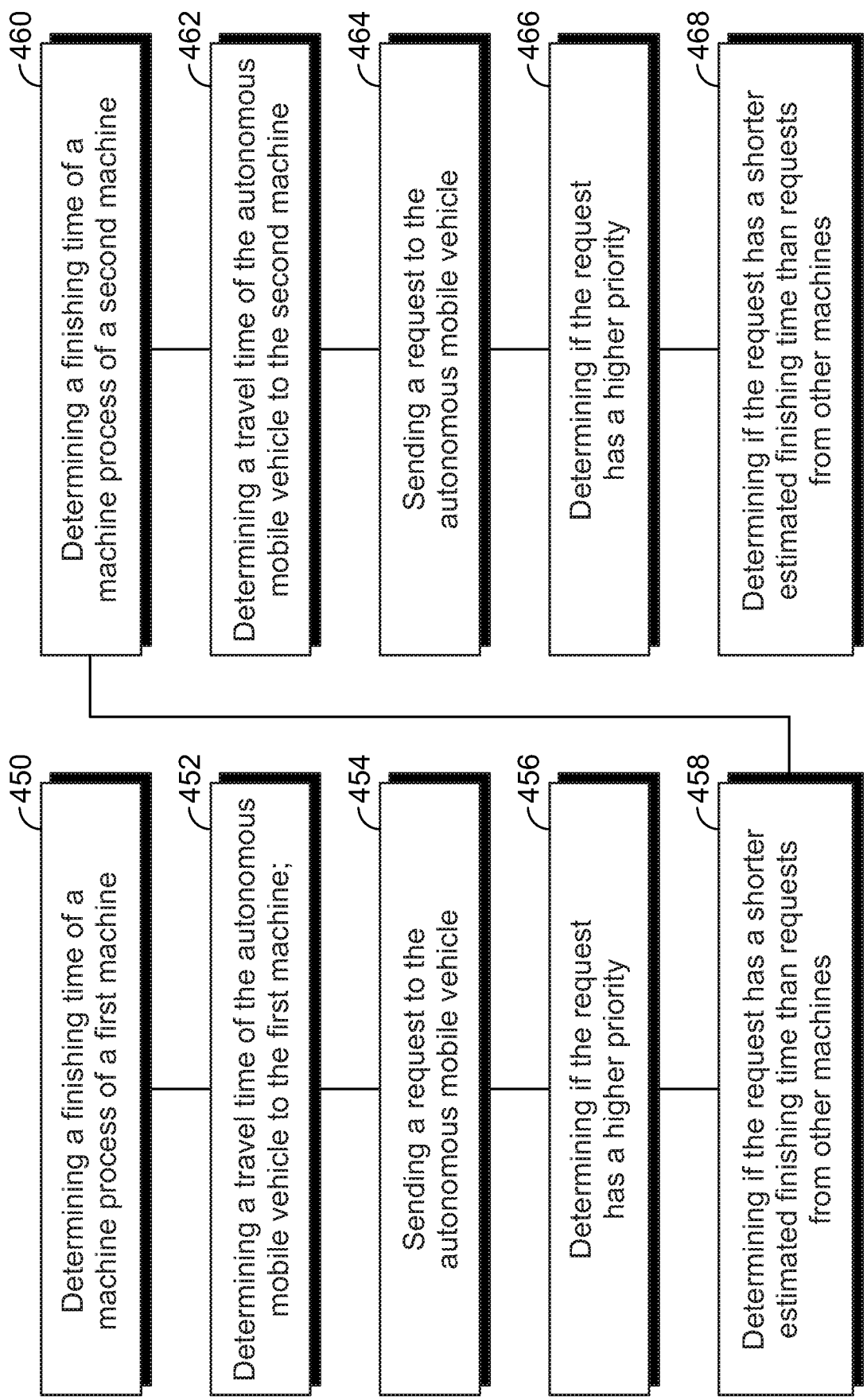
FIG. 4 is a flow chart illustrating a method of operating the autonomous mobile vehicle between machines of a logistic facility.

FIG. 4 is a flow chart illustrating a method of operating the system control module 110 to control the autonomous mobile vehicle(s) 102 between the machines 106 of the logistic facility 104. In various embodiments, the method is used to control movements of one or more of the autonomous mobile vehicles 102 between the machines 106. In various embodiments, the method is used to prioritize requests from the machines 106 and control the autonomous mobile vehicles 102 between the machines 106. In various embodiments, the method is used for planning and controlling operation of the autonomous mobile vehicle system 100 for optimized production of the logistics facility 104.

At 450, the method includes determining a finishing time of a machine process of a first machine of the machines 106. The finishing time may be based on a start time of the machine process. In an exemplary embodiment, the system control module 110 includes the system controller 170 including one or more processors 180 configured to determine a finishing time of a machine process of a first machine of the machines 106. At 452, the method includes determining a travel time of the autonomous mobile vehicle 102 to the first machine. The travel time is based on the location of the autonomous mobile vehicle 102 relative to the first machine. For example, the travel time may be based on the travel distance along a particular route to the first machine. In an exemplary embodiment, the system control module 110 includes the system controller 170 including one or more processors 180 configured to determine a travel time of the autonomous mobile vehicle 102 to the first machine.

At 454, the method includes sending a request to the autonomous mobile vehicle 102 based on the finishing time of the machine process of the first machine and based on the travel time of the autonomous mobile vehicle 102 to the first machine. The request may be placed in a queue of the autonomous mobile vehicle 102. In an exemplary embodiment, the request is sent when the finishing time of the first machine is less than the travel time of the autonomous mobile vehicle 102 to the first machine. The request may be sent only if the autonomous mobile vehicle 102 is available, such as if the autonomous mobile vehicle 102 is sufficiently charged. The request may be sent to multiple autonomous mobile vehicles 102 and the request may be accepted by the autonomous mobile vehicle 102 that has the shortest travel time or the shortest fulfilment time based on the queue of tasks of the autonomous mobile vehicles 102. In an exemplary embodiment, the system control module 110 including the system controller 170 including one or more processors 180 configured to send a request to the autonomous mobile vehicle 102 based on the finishing time of the machine process of the first machine and the travel time of the autonomous mobile vehicle 102 to the first machine and placing the request in the queue of the autonomous mobile vehicle 102.

At 456, the method includes determining if the request from the first machine has higher priority than other requests in the queue. In an exemplary embodiment, if the request from the first machine has higher priority, the autonomous mobile vehicle 102 is sent to the first machine. If the request from the first machine has lower priority, the autonomous mobile vehicle 102 places the request in the queue. In an exemplary embodiment, the system control module 110 including the system controller 170 including one or more processors 180 configured to determine if the request from the first machine has higher priority than other requests in the queue, wherein, if the request from the first machine has higher priority, the system controller 170 sends the autonomous mobile vehicle 102 to the first machine.

At 458, the method includes determining if the request from the first machine has a shorter estimated finishing time than requests from other machines. In an exemplary embodiment, if the request from the first machine has a shorter finishing time, then the autonomous mobile vehicle is sent to the first machine. If the request from the first machine does not have a shorter finishing time, then the autonomous mobile vehicle is sent to the machine with the shortest finishing time. In an exemplary embodiment, the system control module 110 including the system controller 170 including one or more processors 180 configured to determine if the request from the first machine has a shorter estimated finishing time than requests from other machines, wherein if the request from the first machine has a shorter finishing time, the system controller 170 sends the autonomous mobile vehicle 102 to the first machine, and wherein if the request from the first machine does not have a shorter finishing time, the system controller 170 sends the autonomous mobile vehicle 102 to the machine with the shortest finishing time.

At 460, the method includes determining a finishing time of a machine process of a second machine of the machines 106. The finishing time may be based on a start time of the machine process. At 462, the method includes determining a travel time of the autonomous mobile vehicle 102 to the second machine. The travel time is based on the location of the autonomous mobile vehicle 102 relative to the second machine. For example, the travel time may be based on the travel distance along a particular route to the second machine. Steps 460, 462 may occur before or after steps 450, 452 or may occur simultaneously with the steps 450, 452.

At 464, the method includes sending a request to the autonomous mobile vehicle 102 based on the finishing time of the machine process of the second machine and based on the travel time of the autonomous mobile vehicle 102 to the second machine. The request may be placed in a queue of the autonomous mobile vehicle 102. In an exemplary embodiment, the request is sent when the finishing time of the second machine is less than the travel time of the autonomous mobile vehicle 102 to the second machine. The request may be sent only if the autonomous mobile vehicle 102 is available, such as if the autonomous mobile vehicle 102 is sufficiently charged. The request may be sent to multiple autonomous mobile vehicles 102 and the request may be accepted by the autonomous mobile vehicle 102 that has the shortest travel time or the shortest fulfilment time based on the queue of tasks of the autonomous mobile vehicles 102.

At 466, the method includes determining if the request from the second machine has higher priority than other requests in the queue. In an exemplary embodiment, if the request from the second machine has higher priority, the autonomous mobile vehicle 102 is sent to the second machine. If the request from the second machine has lower priority, the autonomous mobile vehicle 102 places the request in the queue.

At 468, the method includes determining if the request from the second machine has a shorter estimated finishing time than requests from other machines, such as the first machine or other machines. In an exemplary embodiment, if the request from the second machine has a shorter finishing time, then the autonomous mobile vehicle 102 is sent to the second machine. If the request from the second machine does not have a shorter finishing time, then the autonomous mobile vehicle is sent to the machine with the shortest finishing time.

Figure 5:
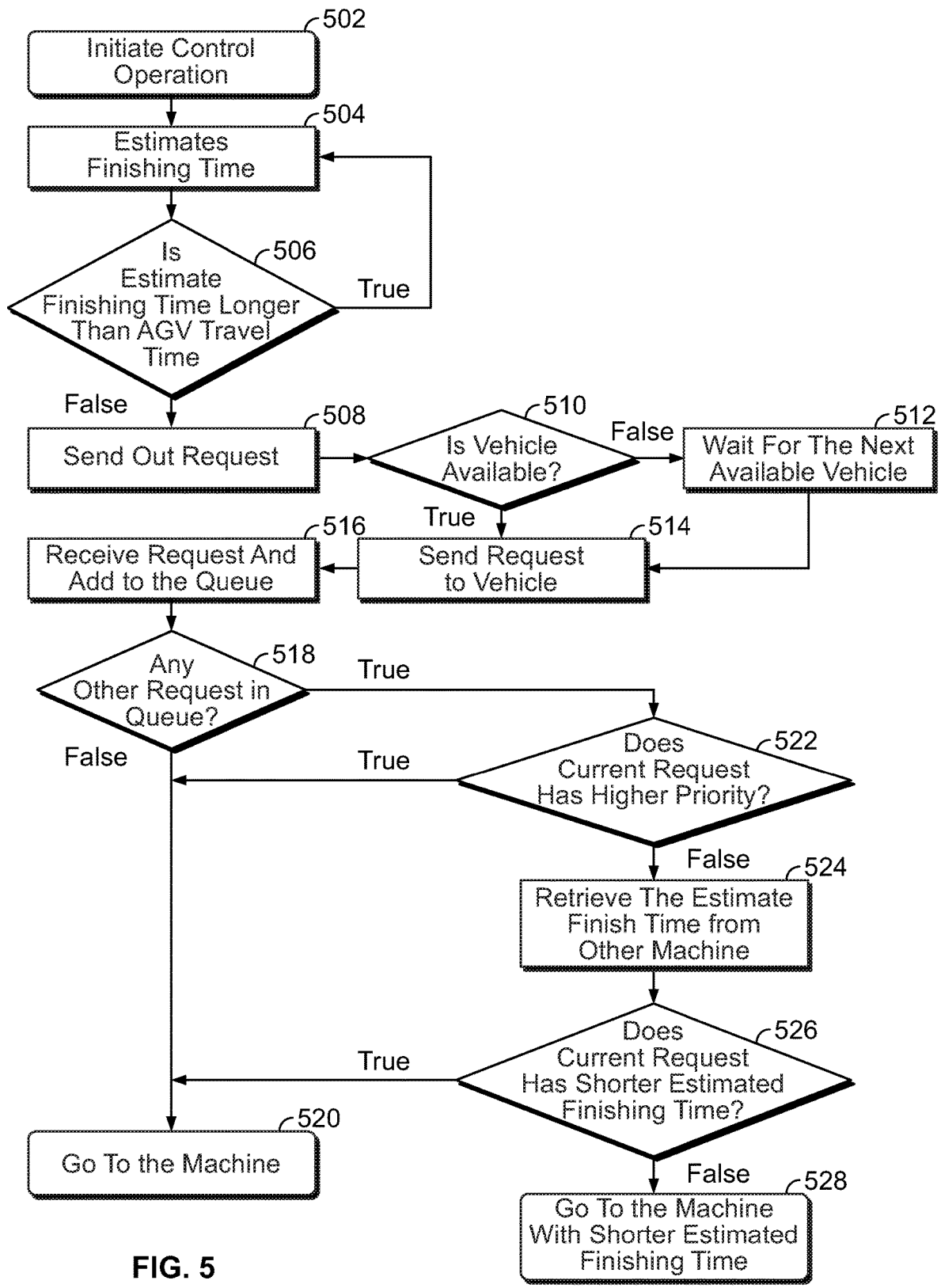
FIG. 5 is a flow chart of a method of operating the autonomous mobile vehicle between the machines of the logistic facility.

FIG. 5 is a flow chart of a method of operating the autonomous mobile vehicle(s) 102 in accordance with an exemplary embodiment. One or more of the carious steps may be performed by the system control module 110 to complete one or more of the steps identified in FIG. 4. In various embodiments, the method is used to control movements of one or more of the autonomous mobile vehicles 102 between the machines 106. In various embodiments, the method is used to prioritize requests from the machines 106 and control the autonomous mobile vehicles 102 between the machines 106. In various embodiments, the method is used for planning and controlling operation of the autonomous mobile vehicle system 100 for optimized production of the logistics facility 104.

At 502, the system control module 110 initiates a control operation. For example, system control module 110 may initiate the control operation when the machine 106 is started or the system control module 110 may initiate the control operation at a predetermined time, such as periodically. At 504, the system control module 110 determines the finishing time of the machine 106. For example, the finishing time may be based on a start time of the machine process. At 506, the system control module 110 determines if the estimated finishing time is longer than a travel time of the autonomous mobile vehicle 102 to the machine 106. If the estimated finishing time is longer than the travel time, then the system control module 110 enters a feedback loop to return to step 504. If the estimated finishing time is shorter than the travel time, the control operation continues to step 508.

At 508, the system control module 110 sends out a request for processing, such as for part pick up. The request may be sent from the system control module 110 or may be sent from the machine 106. At 510, the system control module 110 determines if any autonomous mobile vehicle 102 is available. If no autonomous mobile vehicle 102 is available, then the system control module 110 enters a feedback loop and waits from the next available autonomous mobile vehicle 102 at 512. When the autonomous mobile vehicle 102 is available, at 514, the system control module 110 sends a request to the autonomous mobile vehicle 102. At 516, the autonomous mobile vehicle 102 receives the request and adds the request to the queue.

At 518, the system control module 110 determines if there are any other requests in the queue of the autonomous mobile vehicle 102. Such determination may be made by the system controller 170 or by a controller on the autonomous mobile vehicle 102, such as the AGV controller 202 or the collaborative manipulator controller 402. If there are no other requests in the queue, the control operation continues to step 520. At 520, the autonomous mobile vehicle 102 is sent to the machine 106.

At 518, if there are other requests in the queue, the control operation continues to step 522. At 522, the system control module 110 determines if the current request has higher priority than other requests in the queue. If the current request has the highest priority, the control operation continues to step 520 and the autonomous mobile vehicle 102 is sent to the machine. If the current request does not have higher priority, the control operation continues to step 524.

At 524, the system control module 110 determines estimated finish times from the other machines 106. At 526, the system control module 110 determines if the current request has a shorter estimated finishing time than the estimated finishing time from the other machine(s) 106. If the estimated finishing time of the current request is shorter than the estimated finishing time(s) of the other machine(s), then the control operation continues to step 520 and the autonomous mobile vehicle 102 is send to the machine. If the estimated finishing time of the current request is longer than the estimated finishing time(s) of the other machine(s), then the control operation continues to step 528. At 528, the autonomous mobile vehicle 102 is sent to the machine with the shortest finishing time.

Figure 6:
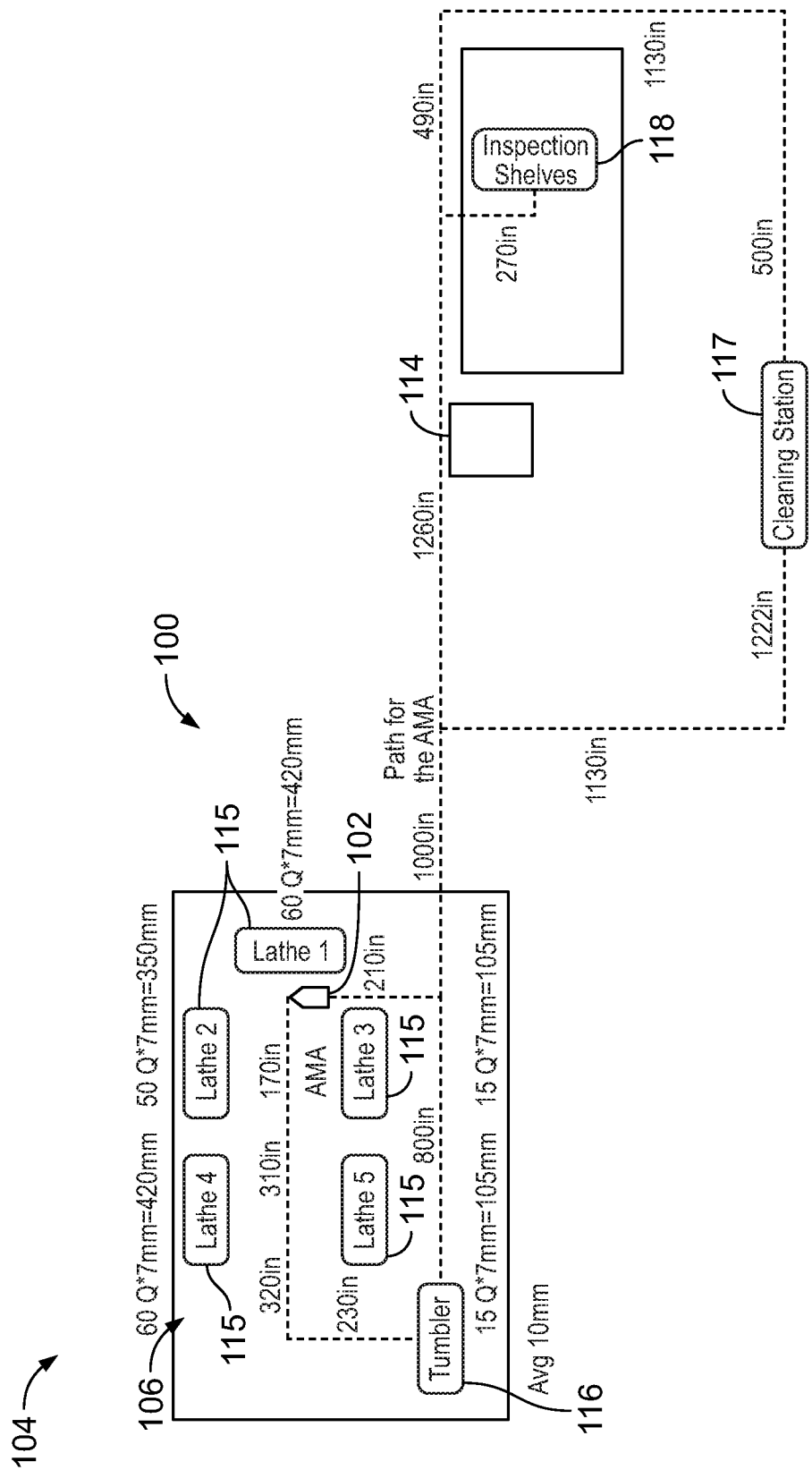
FIG. 6 is a schematic illustration of the autonomous mobile vehicle system used in a first layout of the logistics facility in accordance with an exemplary embodiment.
Figure 7:
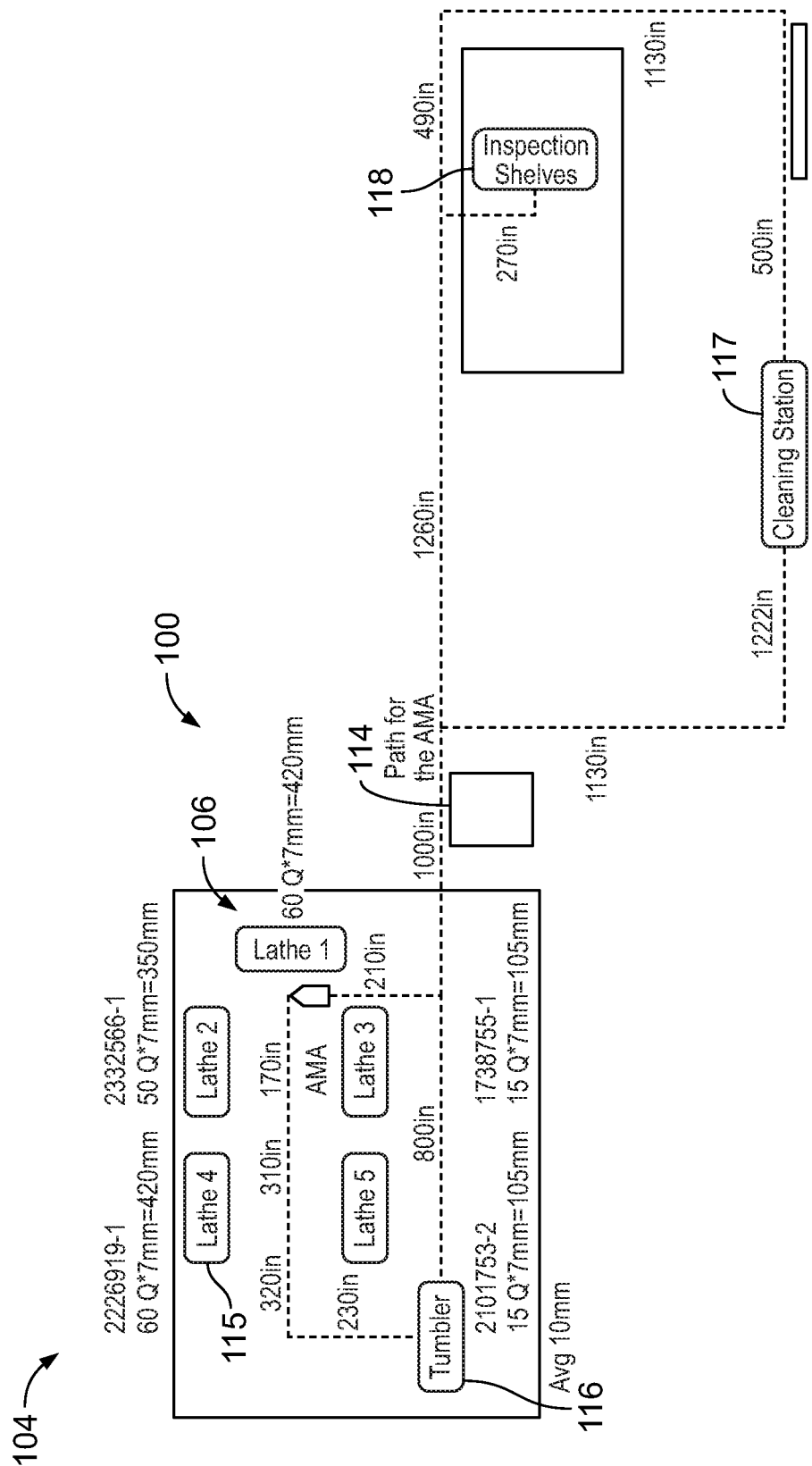
FIG. 7 is a schematic illustration of the autonomous mobile vehicle system used in a second layout of the logistics facility different from the first layout.
Figure 8:
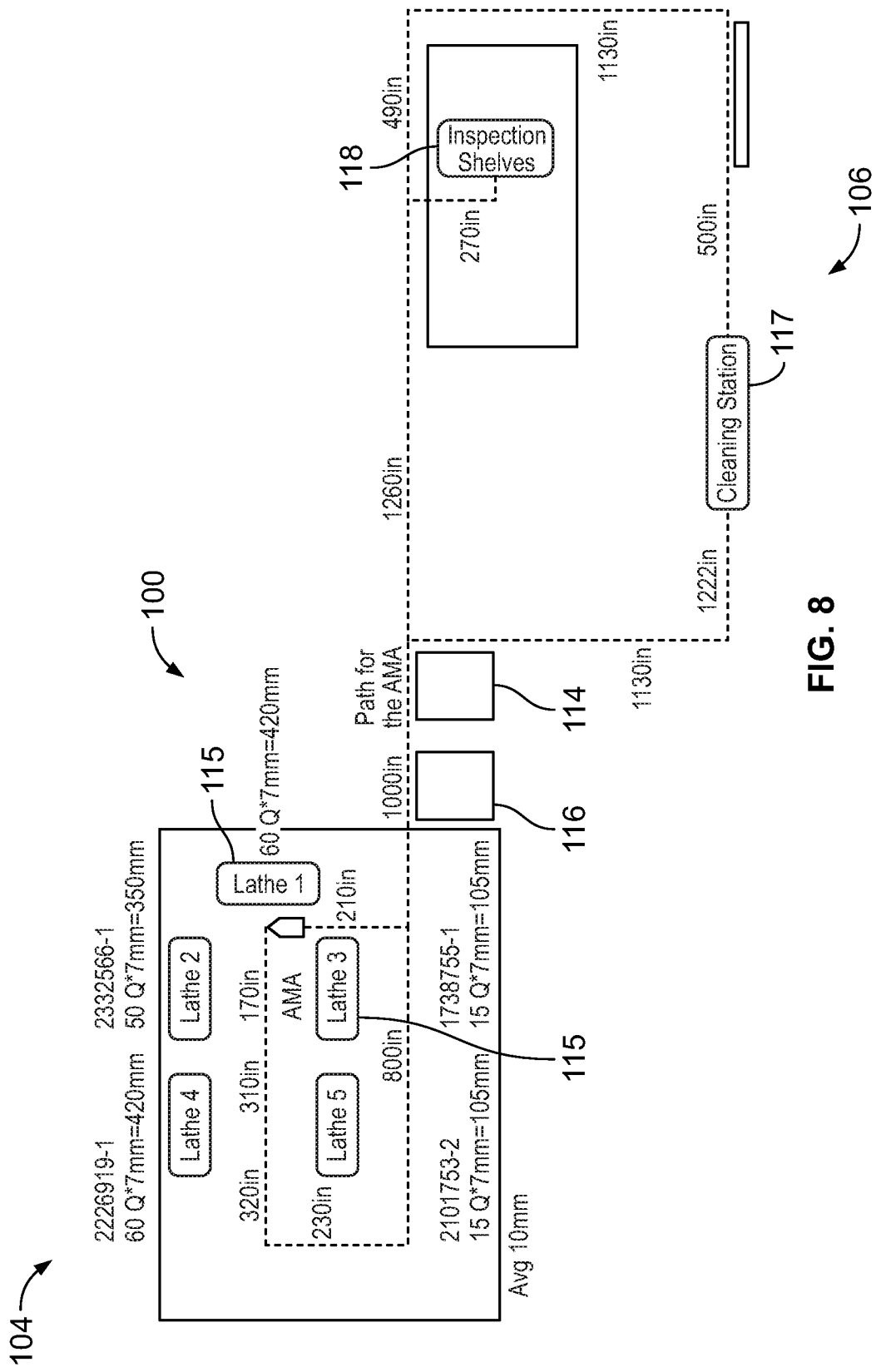
FIG. 8 is a schematic illustration of the autonomous mobile vehicle system used in a third layout of the logistics facility different from the first layout.

FIG. 6 is a schematic illustration of the autonomous mobile vehicle system 100 used in a first layout of the logistics facility 104 in accordance with an exemplary embodiment. FIG. 7 is a schematic illustration of the autonomous mobile vehicle system 100 used in a second layout of the logistics facility 104 different from the first layout. FIG. 8 is a schematic illustration of the autonomous mobile vehicle system 100 used in a third layout of the logistics facility 104 different from the first and second layouts. FIGS. 6, 7, and 8 illustrate various machines 106 in various layouts. For example, in the illustrated embodiment, the machines 106 include the docking station 114, various processing machines 115, such as lathe machines, used for forming parts, a tumbler 116, a cleaning station 117 and an inspection station 118. During manufacture, the parts are formed by the processing machines 115 and then the formed parts are transported to the tumbler 116 for final processing prior to being transported to the cleaning station 117 and then the inspection station 118. Because the tumbler 116 receives the parts from all of the various processing machines in different batches, the tumbler 116 is a critical machine that forms a bottleneck in the throughput of the parts during manufacturing. Workflow to and from the critical machine (for example, the tumbler 116) is important, and therefore may be prioritized. FIG. 7 shows the docking station 114 at an improved location compared to the location in FIG. 6 to improve a utilization rate of the autonomous mobile vehicle 102. For example, in the layout illustrated in FIG. 7, the docking station 114 is located closer to the processing machines 115 and closer to the tumbler 116 as compared to the layout shown in FIG. 6. FIG. 8 shows one of the machines 106, (for instance) the tumbler 116, at an improved location compared to the location in FIGS. 6 and 7 to improve a utilization rate of the autonomous mobile vehicle 102. For example, in the layout illustrated in FIG. 8, the tumbler 115 is located closer to the docking station 114 and closer to the cleaning station 117 as compared to the layout shown in FIGS. 6 and 7.

In an exemplary embodiment, the autonomous mobile vehicle system 100 includes a planning module, such as at the operator station 112 (shown in FIG. 1), for planning and improving the layout of the logistics facility 104. The planning module is configured to simulate various layouts for the logistics facility 104. For example, the planning module may allow an operator to simulate different positions of one or more of the machines 106 to determine utilization rates of the autonomous mobile vehicles 102 based on the simulated layouts. The planning module may be used to determine different utilization rates of the autonomous mobile vehicles 102 based on the number of autonomous mobile vehicles 102 utilized. The planning module may be used to determine the appropriate number of autonomous mobile vehicles 102 to used within a given layout based on the determined utilization rates of the autonomous mobile vehicles 102.

The planning module determines distances between the various machines along predetermined routes or paths. The planning module determines travel times for the autonomous mobile vehicles 102 between the various machines 106. The planning module determines finishing times for the various machine processes of the various machines. The planning module determines processing times for the autonomous mobile vehicles 102 at the various machines 106, such as loading time or unloading time for the parts. The planning module determines a prioritization schedule of processing tasks. The planning module determines utilization rates of the autonomous mobile vehicles 102 based on a simulated workflow. In an exemplary embodiment, the simulated workflow is over a predetermined period, such as a 24 hour period. The planning module compares the utilization rates of the autonomous mobile vehicles 102 based on the various layouts to determine which facility layout has the highest utilization rate to plan the optimum facility layout.

Figure 9:
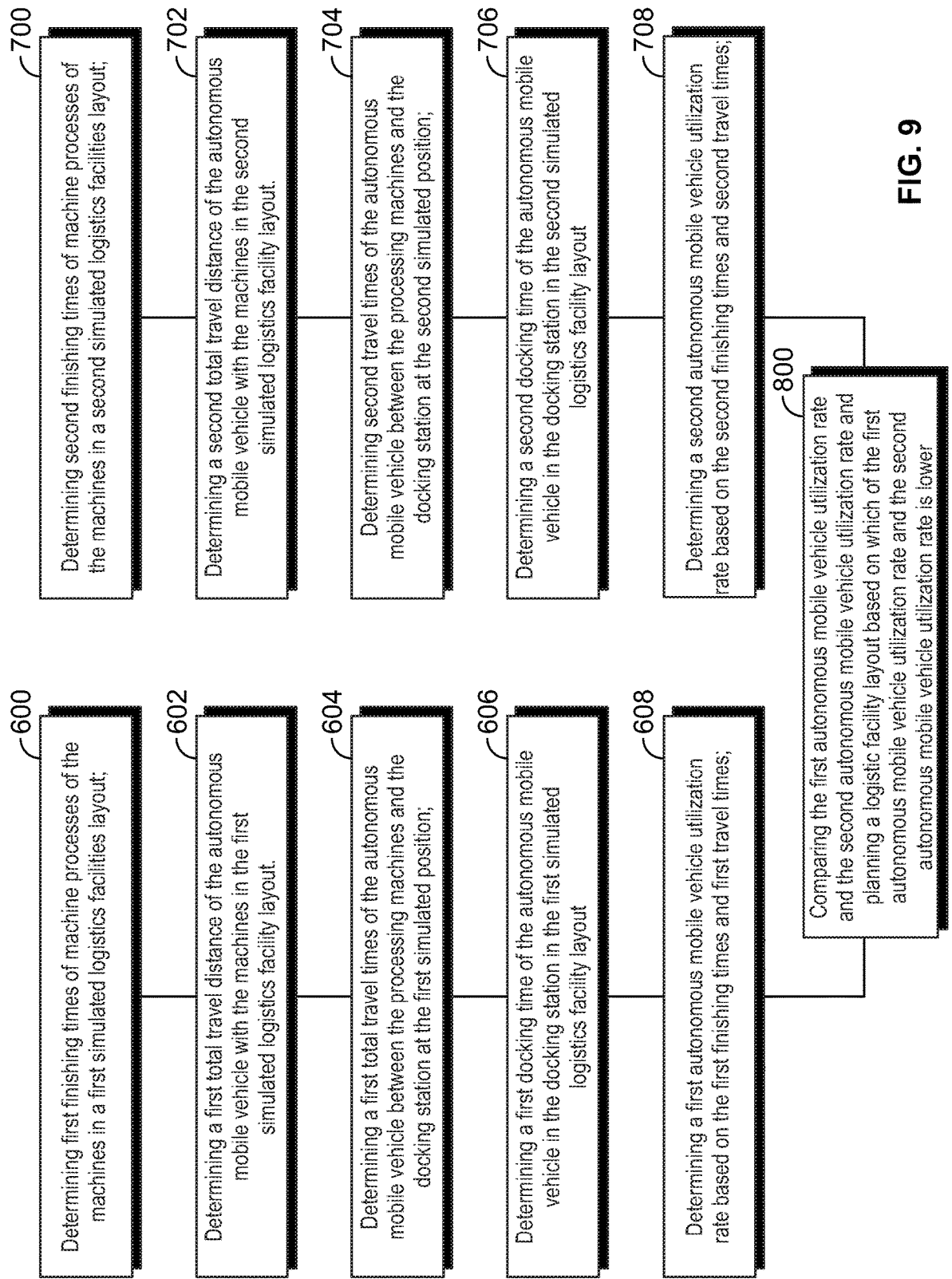
FIG. 9 is a flow chart illustrating a method of planning operation of the autonomous mobile vehicle between the machines of the logistic facility.

FIG. 9 is a flow chart illustrating a method of planning operation of the autonomous mobile vehicle(s) 102 between the machines 106 of the logistic facility 104. The method may be performed by the system control module 110 as a planning tool. In various embodiments, the method is used to determine utilization rates of the autonomous mobile vehicles 102 in various different layouts of the logistics facility 104. The method may be used to determine the appropriate number of autonomous mobile vehicles 102 to be used within a given layout based on the determined utilization rates of the autonomous mobile vehicles 102. The method may be used to plan an optimized logistics facility layout.

At 600, the method includes determining first finishing times of machine processes of the machines in a first simulated logistics facility layout, such as with the docking station 114 at a first simulated position, with the tumbler 116 at a first simulated position, with the processing machines 115 at first simulated positions, and the like. The finishing times may be based on average times to complete particular tasks. For example, each processing machine 115 may have a predetermined finishing time based on the type of part being manufactured, the number of parts being manufactured in each batch, and the like. Each processing machine 115 may have a different average finishing time (for example, one or more machines may manufacture 15 parts at 7 minutes per part for a total finishing time of 105 minutes, one or more other machines may manufacture 50 parts at an average of 6 minutes per part for a total finishing time of 300 minutes, and the like). The processing machines 115 may operate in parallel, each operating simultaneously and having overlapping finishing times. The processing machines 115 may have a storage area allowing storage of parts such that the autonomous mobile vehicle 102 does not need to pick up the parts right at the finishing time while the processing machine works on the next batch of parts. The tumbler 116 may have an average finishing time of approximately 10 minutes in various embodiments. The cleaning station 117 may have an average finishing time of approximately 8 minutes. The inspection station 118 may have an average finishing time of approximately 6 minutes. In various embodiments, because the tumbler 116 has the longest average finishing time in the series portion of the manufacturing operation, the tumbler 116 may be a critical processing machine. However, in alternative embodiments, the cleaning station 117 or the inspection station 118 may have a longer average finishing time leading to such cleaning station 117 or inspection station being the critical processing machine.

At 602, the method includes determining a first total travel distance of the autonomous mobile vehicle 102 with the machines 106 in the first simulated logistics facility layout. The total travel distance may be based on the number of trips the autonomous mobile vehicle 102 makes between each of the various machines 106 within a predetermined amount of time, such as within a 24 hour period. The total travel distance is based on the positions of the machines 106 within the simulated logistics facility layout. The total travel distance is based on the prioritization schedule of performing the processes over the predetermined period, such as over the 24 hour period. The total travel distance is based on the location of the docking station 114 within the layout because the autonomous mobile vehicle 102 may return to the docking station when a charge is needed or when the autonomous mobile vehicle 102 is idle (e.g., no tasks in the queue).

At 604, the method includes determining first travel times of the autonomous mobile vehicle 102 with the machines 106 in the first simulated logistics facility layout. The travel times are based on the travel distances between the machines 106. The travel times are based on the speed of the autonomous mobile vehicle 102.

At 606, the method includes determining a first docking time of the autonomous mobile vehicle 102 in the docking station 114 in the first simulated logistics facility layout. The first docking time is the total time spent in the docking station 114 within the predetermined period, such as the 24 hour period. The first docking time is based on the prioritization schedule, and thus the order, of performing the processes over the predetermined period, such as over the 24 hour period. The first docking time is based on the locations of the machines 106 and thus the travel time back to the docking station 114 for each docking action. The planning module is able to determine if sufficient charging time is provided for the autonomous mobile vehicle 102 within the 24 hour period. For example, the autonomous mobile vehicle 102 may require approximately 50% charging time versus use time in various embodiments. In other various embodiments, the autonomous mobile vehicle 102 may require less charging time, such as 25% charging time versus 75% use time. If insufficient charging time is allowed based on the layout, the planning module may determine that an additional autonomous mobile vehicle 102 is required for the particular layout.

At 608, the method includes determining a first autonomous mobile vehicle utilization rate in the first simulated logistics facility layout. The utilization rate may be based on the finishing times, the travel times, the docking time, and the like. The utilization rate may be based on processing times of the autonomous mobile vehicle 102 at the various machines, such as the amount of loading time or unloading time. The utilization rate may be a percentage of time that the autonomous mobile vehicle 102 is being used for performing a task. The utilization rate may be the inverse of the docking time.

At 700, the method includes determining second finishing times of machine processes of the machines 106 in a second simulated logistics facility layout, such as with the docking station 114 at a second simulated position, with the tumbler 116 at a second simulated position, with the processing machines 115 at second simulated positions, and the like. Some of the positions may be the same as in the first layout. For example, the position of the docking station 114 may be different or the position of the tumbler 116 may be different, or the position of another machine may be different. The finishing times may be based on average times to complete particular tasks.

At 702, the method includes determining a second total travel distance of the autonomous mobile vehicle 102 with the machines 106 in the second simulated logistics facility layout. The total travel distance may be based on the number of trips the autonomous mobile vehicle 102 makes between each of the various machines 106 within a predetermined amount of time, such as within a 24 hour period. The total travel distance is based on the positions of the machines 106 within the simulated logistics facility layout. The total travel distance is based on the prioritization schedule of performing the processes over the predetermined period, such as over the 24 hour period. The total travel distance is based on the location of the docking station 114 within the layout because the autonomous mobile vehicle 102 may return to the docking station when a charge is needed or when the autonomous mobile vehicle 102 is idle (e.g., no tasks in the queue).

At 704, the method includes determining second travel times of the autonomous mobile vehicle 102 with the machines 106 in the second simulated logistics facility layout. The travel times are based on the travel distances between the machines 106. The travel times are based on the speed of the autonomous mobile vehicle 102.

At 706, the method includes determining a second docking time of the autonomous mobile vehicle 102 in the docking station 114 in the second simulated logistics facility layout. The second docking time is the total time spent in the docking station 114 within the predetermined period, such as the 24 hour period. The second docking time is based on the prioritization schedule, and thus the order, of performing the processes over the predetermined period, such as over the 24 hour period. The second docking time is based on the locations of the machines 106 and thus the travel time back to the docking station 114 for each docking action.

At 708, the method includes determining a second autonomous mobile vehicle utilization rate in the second simulated logistics facility layout. The utilization rate may be based on the finishing times, the travel times, the docking time, and the like. The utilization rate may be based on processing times of the autonomous mobile vehicle 102 at the various machines, such as the amount of loading time or unloading time. The utilization rate may be a percentage of time that the autonomous mobile vehicle 102 is being used for performing a task. The utilization rate may be the inverse of the docking time.

At 800, the method includes comparing the first autonomous mobile vehicle utilization rate and the second autonomous mobile vehicle utilization rate. The planning module may determine which utilization rate is the highest and which utilization rate is the lowest. The planning module may determine that the logistic facility layout having the lower utilization rate is optimum (between the number of choices) because the lower utilization rate corresponds to the autonomous mobile vehicle 102 having less use performing tasks. As such, the autonomous mobile vehicle 102 is able to have more charging time in the logistic facility layout having the lower utilization rate. The utilization rate may be lower in a layout having the docking station 114 located closer to the critical processing machine (for example, the tumbler 116) because less time is spent traveling between the docking station 114 and the critical processing machine. The utilization rate may be lower in a layout having the docking station 114 positioned closer to a greater number of machines 106. For example, if the machines 106 are clustered in an area, it may be beneficial to locate the docking station 114 close to such area.

FIG. 10 is a chart showing a utilization rate of a sub-optimal logistic facility layout in accordance with an exemplary embodiment. FIG. 11 is a chart showing a utilization rate of an optimal logistic facility layout (for example, an improved layout compared to the layout shown in FIG. 10) in accordance with an exemplary embodiment. The terms optimal and sub-optimal are used as relative terms in comparison to each other. For example, there may be additional logistic facility layouts that are not simulated, but that would result in an improved utilization rate. The charts illustrate utilization rates of the various facility layouts and are compared to determine which facility layout has a higher utilization rate. The charts compare travel distances, travel times, idle times, and the like to determine utilization rates.

In the illustrated embodiment, the logistic facility layout corresponding to the chart in FIG. 10 has a total of 12.4986 hours in the docking station 114 and 11.5014 hours working, which correspond to a utilization rate of 47.9224. In contrast, the logistic facility layout corresponding to the chart in FIG. 11 has a total of 11.9604 hours in the docking station 114 and 12.0396 hours working, which corresponds to a utilization rate of 50.1652. The logistic facility layout corresponding to the chart in FIG. 11 has a 2% improvement in utilization rate (47.9224 versus 50.1652).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. An autonomous mobile vehicle system for moving one or more autonomous mobile vehicles within a structure of a parts processing facility used for manufacturing parts and having one or more rooms within the structure defining a location within the facility, the facility being one of a warehouse, a distribution center, and manufacturing plant, or a retail facility, the autonomous mobile vehicle system comprising:

part manufacturing machines for performing manufacturing processes on the parts to transform physical characteristics of the parts, the part manufacturing machines located within the location within the structure of the facility;

a docking station within the location within the structure of the facility;

an autonomous mobile vehicle movable within the location within the structure of the facility between the part manufacturing machines and the docking station to pick up the parts processed by the part manufacturing machines and drop off the parts at a drop off location;

a monitoring station in the location within the structure of the facility to monitor operation of the autonomous mobile vehicle; and a system control module for guiding the autonomous mobile vehicle within the location within the structure of the facility between the part manufacturing machines and the docking station to pick up and drop off the parts, the system control module includes a system communication module communicatively coupled to the monitoring station and the autonomous mobile vehicle, the system control module located within the structure to communicate wirelessly with the autonomous mobile vehicle as the autonomous mobile vehicle moves within the structure to control movement of the autonomous mobile vehicle within the structure, the system control module including a system controller comprising:

one or more processors configured to determine a finishing time of a machine process of a first machine of the part manufacturing machines within the location within the structure of the facility, the finishing time being a time of completion of the machine process of the first machine;
one or more processors configured to determine a travel time of the autonomous mobile vehicle within the location within the structure of the facility to the first machine;
one or more processors configured to send a request to the autonomous mobile vehicle based on the finishing time of the machine process of the first machine and the travel time of the autonomous mobile vehicle to the first machine and placing the request in the queue of the autonomous mobile vehicle;
one or more processors configured to sort the queue of the autonomous mobile vehicle, wherein the request is initially sorted into the queue based on the finishing time of the machine process of the first machine and wherein the request is moved higher in the queue to control the autonomous mobile vehicle based on priority of the pick up of the part or drop off of the part associated with the first machine.

2. The autonomous mobile vehicle system of claim 1, wherein the system controller sends the request when the finishing time of the machine process of the first machine is less than the travel time of the autonomous mobile vehicle to the first machine.

3. The autonomous mobile vehicle system of claim 1, wherein the system controller includes one or more processors configured to determine if the autonomous mobile vehicle is available, the system controller sending the request if the autonomous mobile vehicle is available.

4. The autonomous mobile vehicle system of claim 1, wherein the system controller includes one or more processors configured to determine if the autonomous mobile vehicle is sufficiently charged.

5. The autonomous mobile vehicle system of claim 1, wherein the system controller includes one or more processors configured to determine if the autonomous mobile vehicle has other requests in the queue, wherein if the autonomous mobile vehicle does not have other requests in the queue, then the system controller sends the autonomous mobile vehicle to the first machine.

6. The autonomous mobile vehicle system of claim 1, wherein the system controller comprises:
one or more processors configured to determine a finishing time of a machine process of a second machine of the part manufacturing machines, the finishing time being a time of completion of the machine process of the second machine;
one or more processors configured to determine a travel time of the autonomous mobile vehicle to the second machine;
one or more processors configured to send a request to the autonomous mobile vehicle based on the finishing time of the machine process of the second machine and the travel time of the autonomous mobile vehicle to the second machine and placing the request in the queue of the autonomous mobile vehicle;
one or more processors configured to sort the queue of the autonomous mobile vehicle, wherein the request from the second machine is initially sorted into the queue based on the finishing time of the machine process of the second machine and wherein the request is moved higher in the queue based on priority of the pick up of the part or drop off of the part associated with the second machine.

7. A method of operating an autonomous mobile vehicle between part manufacturing machines within a structure of a logistic facility used for performing manufacturing processes on the parts to transform physical characteristics of the parts and having one or more rooms within the structure defining a location within the facility, the facility being one of a warehouse, a distribution center, and manufacturing plant, or a retail facility, the method comprising:
monitoring operation of the autonomous mobile vehicle in the location within the structure of the logistic facility including movement of the autonomous mobile vehicle between the part manufacturing machines in the location within the logistics facility;
determining a finishing time of a machine process of a first machine of the part manufacturing machines within the location within the structure of the logistics facility, the finishing time being a time of completion of the machine process of the first machine;
determining a travel time of the autonomous mobile vehicle in the location within the structure of the logistics facility to the first machine;
sending a request to the autonomous mobile vehicle based on the finishing time of the machine process of the first machine and the travel time of the autonomous mobile vehicle to the first machine and placing the request in the queue of the autonomous mobile vehicle;
determining if the request from the first machine is a high priority request based on priority of the pick up of the part or drop off of the part associated with the first machine;
sorting the queue of the autonomous mobile vehicle to control the autonomous mobile vehicle within the location within the structure of the facility, wherein the request is initially sorted into the queue based on the finishing time of the machine process of the first machine and wherein the request is moved higher in the queue if the request is a high priority request.

8. The method of claim 7, wherein said sending the request occurs when the finishing time of the machine process of the first machine is less than the travel time of the autonomous mobile vehicle to the first machine.

9. The method of claim 7, further comprising determining if the autonomous mobile vehicle is available, said sending the request comprises sending the request if the autonomous mobile vehicle is available.

10. The method of claim 9, wherein said determining if the autonomous mobile vehicle is available comprises determining if the autonomous mobile vehicle is sufficiently charged.

11. The method of claim 7, further comprising receiving the request at the autonomous mobile vehicle and determining if the autonomous mobile vehicle has other requests in the queue, wherein if the autonomous mobile vehicle does not have other requests in the queue, then the autonomous mobile vehicle is sent to the first machine.

12. The method of claim 7, further comprising:
determining a finishing time of a machine process of a second machine of the part manufacturing machines, the finishing time being a time of completion of the machine process of the second machine;
determining a travel time of the autonomous mobile vehicle to the second machine;
sending a request to the autonomous mobile vehicle based on the finishing time of the machine process of the second machine and the travel time of the autonomous mobile vehicle to the second machine and placing the request in the queue of the autonomous mobile vehicle;

determining if the request from the second machine is a high priority request based on priority of the pick up of the part or drop off of the part associated with the first machine;

sorting the queue of the autonomous mobile vehicle, wherein the request from the second machine is initially sorted into the queue based on the finishing time of the machine process of the second machine and wherein the request from the second machine is moved higher in the queue if the request is a high priority request.

13. A method of planning a logistic facility layout for an autonomous mobile vehicle operation between part manufacturing machines in a location within a structure of a logistic facility used for manufacturing parts by performing manufacturing processes on the parts to transform physical characteristics of the parts and having at least one room defining the location and a docking station in the location within the structure of the logistic facility, the method comprising:

determining first finishing times of machine processes of the part manufacturing machines with the docking station at a first simulated position in the location within the structure of the logistic facility, the first finishing times being times of completion of the machine processes of the part manufacturing machines;

determining second finishing times of machine processes of the part manufacturing machines with the docking station at a second simulated position in the location within the structure of the logistic facility, the second finishing times being times of completion of the machine processes of the part manufacturing machines;

determining first travel times of the autonomous mobile vehicle in the location within the structure of the logistic facility between the part manufacturing machines and the docking station at the first simulated position;

determining second travel times of the autonomous mobile vehicle in the location within the structure of the logistic facility between the part manufacturing machines and the docking station at the second simulated position;

determining a first autonomous mobile vehicle utilization rate based on the first finishing times and first travel times based on the part manufacturing machines and the docking station at the first simulated position;

determining a second autonomous mobile vehicle utilization rate based on the second finishing times and second travel times based on the part manufacturing machines and the docking station at the second simulated position;

comparing the first autonomous mobile vehicle utilization rate and the second autonomous mobile vehicle utilization rate to determine which utilization rate is lower; and planning a logistic facility layout including a layout position of the docking station relative to the part manufacturing machines at either the first simulated position or the second simulated position based on which of the first autonomous mobile vehicle utilization rate and the second autonomous mobile vehicle utilization rate is lower.

14. The method of claim 13, wherein the part manufacturing machines include a first processing machine, the first processing machine being a critical processing machine, the docking station being located a first distance from the first processing machine at the first simulated position, the docking station being located a second distance from the first processing machine at the second simulated position, the second distance being greater than the first distance, the first and second travel times being based on the first distance and the second distance such that the first and second autonomous mobile vehicle utilization rates are affected by the first and second distances.

15. The method of claim 13, wherein the part manufacturing machines include a first processing machine and a second processing machine, the docking station at the first simulated position being located a first distance from the first processing machine and a second distance from the second processing machine, the docking station at the second simulated position being located a third distance from the first processing machine and a fourth distance from the second processing machine, the first travel times being based on the first distance and the second distance such that the first autonomous mobile vehicle utilization rate is affected by the first and second distances, the second travel times being based on the third distance and the fourth distance such that the second autonomous mobile vehicle utilization rate is affected by the third and fourth distances.

16. The method of claim 13, further comprising:

determining a first docking time of the autonomous mobile vehicle in the docking station in the first simulated position, the first autonomous mobile vehicle utilization rate being based on the first docking time of the autonomous mobile vehicle at the docking station; and determining a second docking time of the autonomous mobile vehicle in the docking station in the second simulated position, the second autonomous mobile vehicle utilization rate being based on the second docking time of the autonomous mobile vehicle at the docking station.

17. The method of claim 13, further comprising determining processing times of the autonomous mobile vehicle at the part manufacturing machines, the first and second utilization rates being based on the processing times.

18. The method of claim 13, further comprising determining a prioritization schedule of processing tasks between the part manufacturing machines and the docking station.

19. The method of claim 13, further comprising determining a first total travel distance of the autonomous mobile vehicle with the docking station at the first simulated position and determining a second total travel distance of the autonomous mobile vehicle with the docking station at the second simulated position, wherein the first and second utilization rates are based on the first and second total travel distances.

* * * * *